US000001350H

United States Statutory Invention Registration [19]

[11] Reg. Number: H1350

Desmond et al.

[43] Published: Sep. 6, 1994

[54] SEALANT APPLICATOR AND METHOD OF SEALANT APPLICATION FOR AMMUNITION

[75] Inventors: Anthony T. Desmond, Budd Lake; William J. Russell, Sparta, both of N.J.

[73] Assignee: The United States of America as represented by the Secretary of the Army, Washington, D.C.

[21] Appl. No.: 967,310

[22] Filed: Oct. 28, 1992

Related U.S. Application Data

[63] Continuation of Ser. No. 936,173, Aug. 27, 1992, abandoned.

[51] Int. Cl.[5] ..... F42B 33/14

[52] U.S. Cl. ..... 86/17; 86/1.1; 118/100; 118/404

*Primary Examiner*—Harold J. Tudor

*Attorney, Agent, or Firm*—Anthony T. Lane; Edward Goldberg; Michael Sachs

[57] ABSTRACT

The invention relates to coating devices and methods for application of sealant to ammunition. Provided is a mechanically simple and effective way of weatherproofing or coating high volumes of small caliber sabot ammunition or similar items. The coating device typically consists of a container device, which is chamber of sufficient size and volume to hold sealant, covered by an integral lid comprising a frame holding a diaphram, sealant and means for applying the sealant. The frame and the diaphram are provided with aligning holes. The holes are sized to permit the object to be coated to penetrate through the frame, and deformably penetrate through the diaphram into the chamber and contacting the sealant and means of application. The means to apply the sealant may be a sealant dip, a series of spray jets to spray the sealant, a felt stamp pad, a fluidized bed, various combinations of these or any other type of application means to uniformly coat the object.

14 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SEALANT APPLICATOR AND METHOD OF SEALANT APPLICATION FOR AMMUNITION

GOVERNMENT INTEREST

The invention described herein may be manufactured, used and licensed by or for the Government for Governmental purposes without the payment to us of any royalties thereon.

This application is a continuation of application Ser. No. 07/936,173, filed Aug. 27, 1992, now abandoned.

BACKGROUND OF THE INVENTION

In the past, it has proved advantageous to apply sealants to ammunition. In order to optimize the sealant material, considerations were given to the sealant's affect on the interior ballistics of the round or the sabot separation mechanism. Specifically, waterproofing materials were sought which would not change the average velocity or the sabot separation mechanism. Optimum was, and is, no net increase in the lubricity of the interfaces between the round and the chamber because it ensures that there is no slipping failure which would keep the round from achieving full velocity. To achieve optimum, typically, relatively weak adhesion/cohesion properties were necessary. However, using sealants with relatively weak adhesion/cohesion properties presented coating problems because the sealant would not readily adhere to the round or sabot if merely dipped into the sealant material. Surface preparation could have been used to increase adhesion properties, but such a procedure, for manufacturing, was, and is, undesirable because it substantially increases the manufacturing operation and reduces manufacturing efficiency.

For coating of ammunition, sealant thickness was also a critical factor in the success of the sealant use. The clearances necessary for chambering of the round were small; the sealant coat had to be uniformly thin. Weapons permitted, for example, no more than 0.0002 in (0.04 mm) clearance in the chamber, so the sealant had to be as thin as possible, adding no more than 0.0001 in (0.02 mm) to the sabot diameter.

Other considerations for optimum sealant effectiveness included minimizing the sealant residue left in the chamber. Foreign material in the chamber increased potential cleaning procedures and increased the risk of foreign material ignition in the chamber.

For sealant application, several methods have been used to apply sealants to small caliber ammunition. These included dipping the round in a pool of sealant material, brushing the sealant material onto the round, and using a spray jet to spray the material onto the surface of the round. None of these methods worked well. For example, in addition to the adhesion problems associated with dipping the flechette cartridge, the round usually had shapes which provided for excess pooling of the sealant at the round nose. Allowing it to air dry also caused bulges or excess of material to form around the sabot nose. Moreover, this pooling or excesses of the sealant created sealant coatings with spot thicknesses in excess of the tolerance specifications.

Brushing the sealant onto the round was an alternative means of applying a sealant coat. However, it was time consuming and impractical. With brush application, quality control was difficult. Coatings applied with paint brushes had excessive thicknesses and uneven sealant layer regardless of attempts at quality control.

This technique was only practical on a laboratory scale; brush application was not possible for a manufacturing scale coating operation. A method having limited success was the felt application. A felt application consisted of pressing the sabot into a resilent material in which a hole was drilled. The felt helped to reduce the excess sealant because it cased some of the excess to be wiped off as it was removed from the felt. However, unevenly thick spots in the coating was still a problem.

It was, and still is, desirable for sealant application techniques to be as mechanically simple as possible. Spraying was another prior art method of coating the round. Spray techniques, however, are mechanically complex and have inherent problems with clogging of the spray nozzles with sealant material.

In the manufacturing process, it was also desirable to coat the round with sealant after the round manufacture was complete. It was desirable to apply the sealant to the completed round after all assembly, but before quality assurance. This gave minimum disturbance to existing production lines and provided for a completely coated finished product.

Optimization of manufacturing efficiency with high consistency and repeatability, and uniformity of the thin sealant coat was highly desirable but not achieveable in the past. Because of sabot geometry and sealant viscosity and adhesion/cohesion characteristics, the sealant, then, needed to be physically pressed into the sabot seams and the excess material removed so that the projectile fit into the rifle chamber; none of the prior art procedures provided for application of the necessary consistently thin, uniform sealant coat in a time efficient manner.

Accordingly, there has existed a definite need for a sealant applicator and method of sealant application for ammunition. The present invention satisfies these and other needs, and provides further related advantages.

SUMMARY OF THE INVENTION

The present invention provides a coating device and method for application of sealant coatings to ammunition. Provided is a mechanically simple and effective way of weatherproofing or coating high volumes of small caliber sabot ammunition or similar items. The advantages of this invention are the simplicity of the operation, the effect of pressing or stamping the sealant into the sabot seams where it is most needed, good quality control, and the high success rate of the operation.

The coating device of the present invention consists of a container device, which is chamber of sufficient size and volume to hold a reserve volume of sealant (with exact size determined by a number of objects to be coated) covered by an integral lid comprising a frame holding a diaphram, and a sealant and means inside the chamber for applying the sealant. Both the frame and the diaphram are each provided with a hole therein. The hole in the frame is larger than the diaphram hole and the center points of each align. The holes are sized to permit the object to be coated to penetrate through the frame, and deformably penetrate through the diaphram into the chamber for contact with the sealant and means of application.

The chamber contains both the coating material and the means to apply the coating, whether the means is a pool of material for dipping, a series of spray jets to spray the coating, a felt stamp pad to stamp the cylinder into, a fluidized bed, various combinations of these or any other type of application means to uniformly coat the object. The chamber bottom and/or sides can be further lined with a resilient material, such as felt or sponge, or a harder elastomer.

For coating operations of more than one object at a time, the integral lid can be modified to contain any number of holes, with either multiple diaphrams, or one integral diaphram with multiple holes, such that each diaphram hole is surrounded by a frame hole of larger diameter for which the center points of the frame hole and the diaphram hole align. The chamber also can be multiple chambers, or one chamber provided that each chamber contains the means to apply the coating and the coating material.

In the typical coating process of the present invention, the squeegee/dip process, the chamber is filled with sealant and dipping is the means of application. In another preferred embodiment, the squeegee/dip/felt process, the chamber may be further provided with a resilient bottom such as a felt stamp pad or other resilient bottom. The object to be treated is then inserted deformably through the diaphram and down into the chamber. The object is dipped in and through the sealant. If using a stamp pad or resilient bottom, the object is then pressed firmly into pad or bottom. Thereafter, the object is withdrawn back through the dip and then the diaphram. The diaphram acts as a squeegee, which removes the excess sealant from the object and the object is withdrawn. This gives an exceedingly thin, uniform, pore-free coating over the entire surface of the object inserted into the coating device.

The preferred embodiments for the coating devices and means to apply the coating are the squeegee/dip and squeegee/dip/felt, and their associated application methods. These methods provide a high success rate in scaling the cartridge while depositing a suitably thin sealant layer on the ammunition, for example, the sabot surface. Of these two methods, the squeegee/dip/felt method is better because of the forced removal of air pockets from the concave nose of the sabot. For application of sealants, such as cellulose nitrate and asphalts, to 5.56 mm flechette cartridges, sealants, the squeegee/-dip and squeegee/dip/felt coating devices and the methods of application for their use are preferable because they provide mechanically simple, but accurate methods for application.

The devices and processes of the present invention have several advantages over previous coating devices and methods. First, the process is mechanically simple and reliable. The only complex part would be spray jets (if used), which could be driven with medium-pressure. Second, the materials needed are quite inexpensive and easily purchased. Third, a thin, pore-free uniform coating of a specific thickness is easily obtained as long as the diameter of the frame hole and the diaphram hole are of a specific reproducible size and the diaphram material is an elastomer of resilience and toughness such that the hole tolerance is not degraded upon multiple uses. Fourth, the process is quick and well-suited to high volume, high speed production line environments.

It is therefore an object of the present invention to provide a device and method for application of sealant coatings to objects such as ammunition.

It is a further object of the present invention to provide a coating process which is mechanically simple, accurately repeatable, and reliable.

Still another object of the present invention is to provide a device for coating and coating process with which a thin, pore-free uniform coating of a specific thickness is easily obtained.

An additional object of the present invention is to provide a process for sealant coatings using sealants with relatively weak adhesion/cohesion properties.

Yet a further object of the present invention is to provide a process and device for sealant coating of ammunition which is quick and well suited to high volume, high speed production line environments.

A still further object of the present invention is to provide a device and process for sealant coatings which deposits the thinnest coating possible, so as to minimize sealant residue left in the chamber after firing, and to minimize the sealant's affect on the interior ballistics of the round or the sabot separation mechanism.

Further objects and advantages of this invention will become more apparent in light of the following drawings and description of the preferred embodiments of the invention.

BRIEF DESCRIPTION OF THE DRAWINGS

The accompanying drawings illustrate the invention. In such drawings.

DESCRIPTION OF THE PREFERRED EMBODIMENTS

Figure 1:
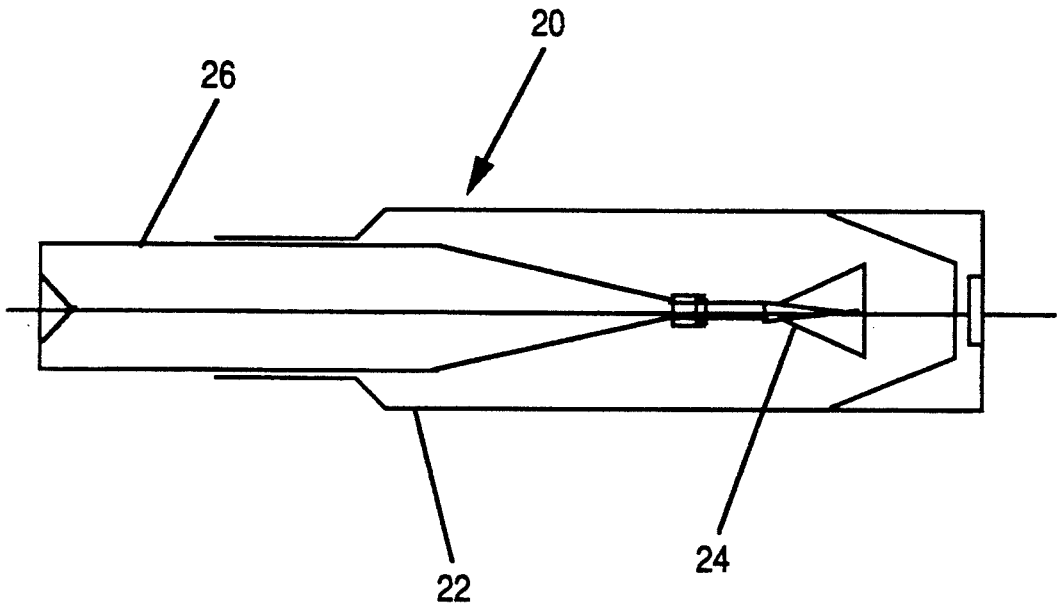
FIG. 1 is a cross sectional view of a typical ammunition round to be coated with a sealant using the devices and methods of the embodiments of the present invention.

As shown in the accompanying drawings, the present invention is embodied in a coating device generally referred to by the reference numeral 18, such as shown in FIGS. 11–14, for application of a thin sealant film to ammunition.

Figure 2:
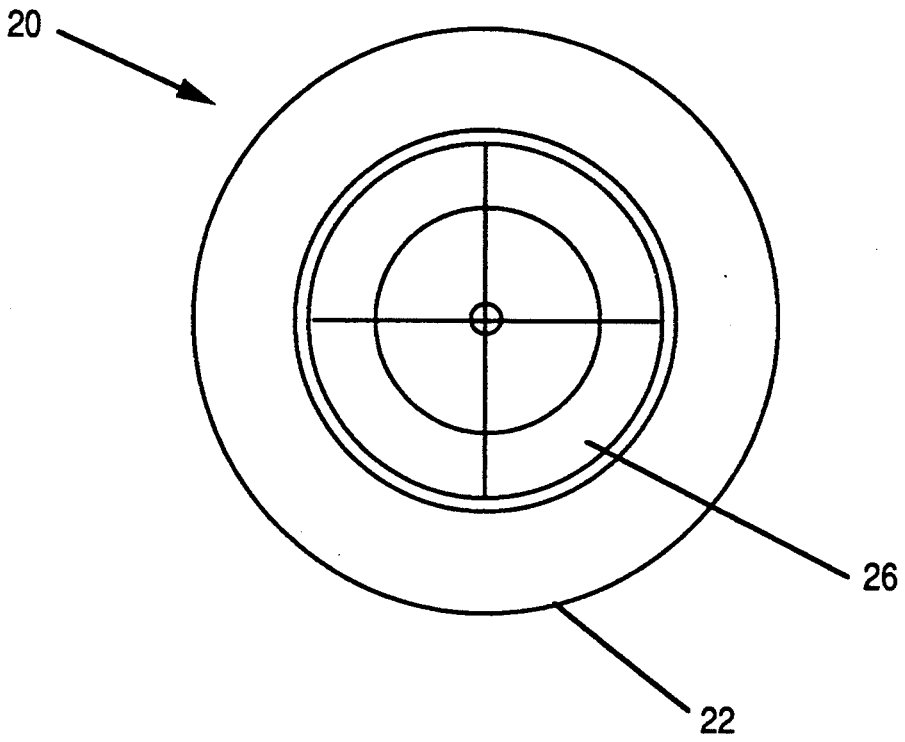
FIG. 2 is an end view taken substantially along the line 2—2 of a typical ammunition round to be coated with a sealant using the devices and methods of the embodiments of the present invention. P

In FIGS. 1 and 2 there is shown a typical object, a flechette cartridge 20 for sealant coating as disclosed for the present invention. The flechette cartridge 20 is comprised of the sabot 26, having a flechette 24 end, enclosed in a cartridge case 22. FIG. 2 is and end view of the flechette cartridge 20.

Figure 3:
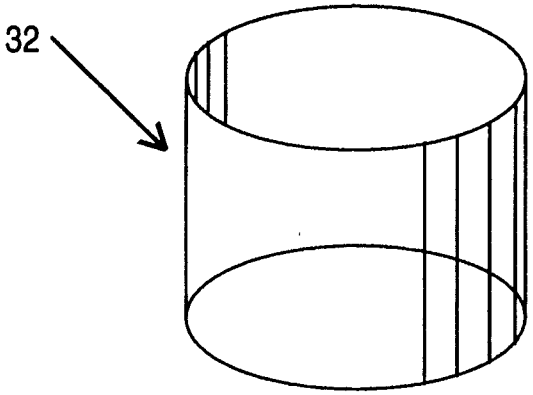
FIG. 3 (PRIOR ART)
FIG. 3 is a perspective view of a chamber of a container device for containing and applying a sealant coating to ammunition in the present invention.

In FIG. 3 there is shown a perspective view of a chamber 32 used in both the prior art, and in the present invention, for containing the sealant and means of application of sealant to a flechette cartridge 20. The chamber 32 is preferably a cylinder, yet any other shape is acceptable provided that it is capable of containing liquid sealant and application means.

Figure 5:
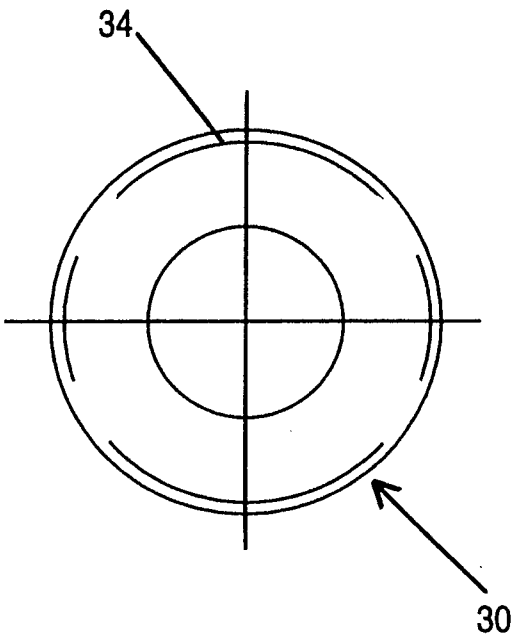
FIG. 5 (PRIOR ART)
FIG. 5 is a top view of the lid of a prior art container device for containing and applying sealant coating to ammunition.
Figure 4:
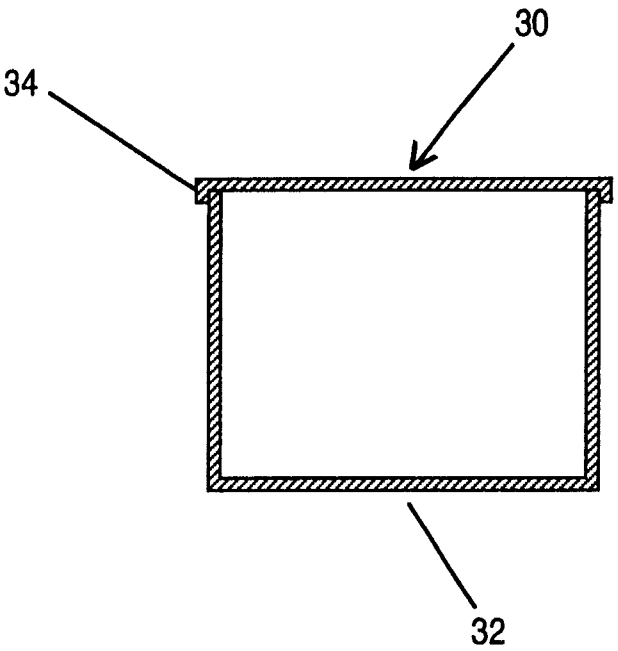
FIG. 4 (PRIOR ART)
FIG. 4 is a cross sectional view of a prior art container device, consisting of a chamber and a lid, for containing and applying sealant coating to ammunition.

FIG. 4 is a sectional view of a prior art container device 30. The prior art container device 30 consists of a chamber 32 and a lid 34. The lid 34 is provided with a hole therein for inserting a flechette cartridge 20 or other object down into the container device 30. In the prior art, the container device 30 was provided with sealant and a means for applying the sealant when the flechette cartridge 20 was lowered through the hole in the lid 34. The lid 34, shown in FIG. 5 viewed from the top, was typically constructed of a hard material, such as a metal alloy.

Figure 8:
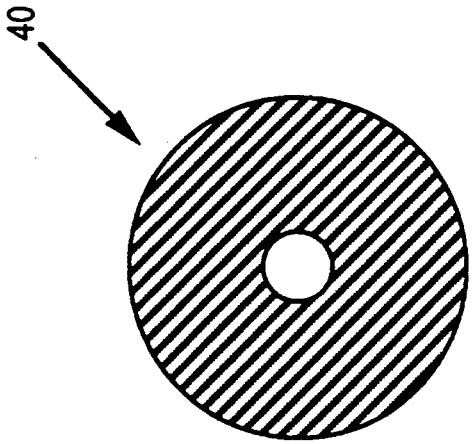
FIG. 8 is a top view of a diaphram which is a part of the integral lid of the present invention.
Figure 7:
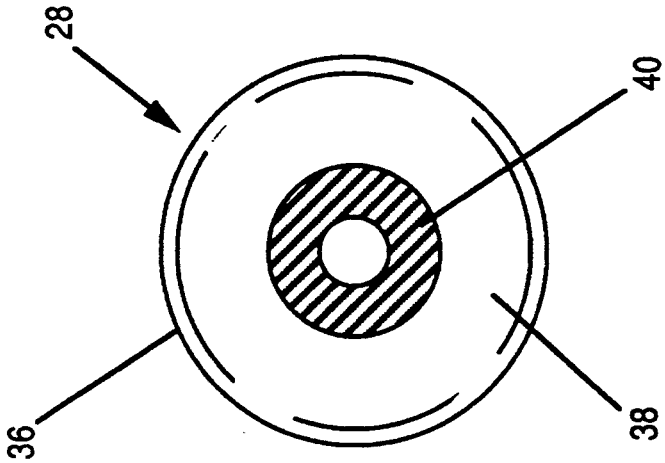
FIG. 7 is a top view of the integral lid of a container device of the present invention for containing and applying sealant coatings to ammunition.
Figure 6:
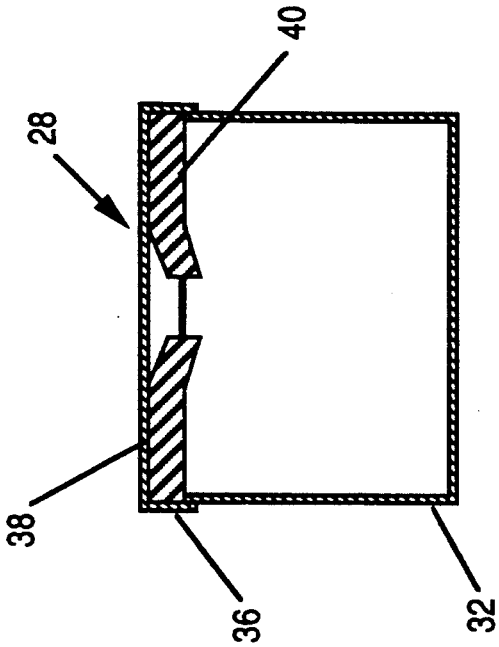
FIG. 6 is a cross sectional view of a container device, consisting of a chamber and an integral lid, of the present invention for containing and applying sealant coatings to ammunition.

Referring now to FIG. 6, there is shown a sectional view of a container device 28 of the present invention. The container device 28 consists of a chamber 32 and an integral lid 36. The integral lid 36 is comprised of a frame 38 and a diaphram 40. FIG. 7 is a top view of the integral lid 36. FIG. 8 is a top view of the diaphram 40. The diaphram 40 is preferably made of an elastomeric material. The diaphram 40 includes a hole for deformable penetration of the flechette cartridge 20. The frame 38 of the integral lid 36 also includes a hole which aligns with the center point of the hole in the diaphram 40 and permits penetration through the frame 38, and on through the diaprhram 40. The frame 38 may be attached to the diaphram 40, surround the diaphram 40 as shown in FIG. 6, or comprise two (2) pieces, each with a center hole, for attachment on either side of the diaphram 40. The diaphram 40 is preferably between one-sixteenth (1/16) and one half (½) inch thick with the hole of a diameter approximately 0.25 mils (0.025 in) smaller than the frame 38 is cut. The hole in the elastomeric diaphram is sized so that the hole is slightly smaller, preferably several mils, than the object intended to be coated. The diaphragm 40 is preferably elastomeric and can be made from any elastomer-of a desired hardness such as an elastomer with a Durometer A40–45 hardness, having the desired chemical resistance. An elastomer with minimum swelling potential when subjected to the chemicals/solvents used as sealants is preferred; elastomeric solvent resistance is a primary consideration. The silicone rubber used in the diaphram 40 may swell up to 40% in the solvent mixture used. Polysulfide or similar elastomer of the same hardness as the silicon elastomer can also be used successfully due to polysulfides good chemical resistance.

In FIG. 6 the integral lid 36 is shown preferably as an annulus shaped lid, with the hole in the frame 38 larger than the radius of the hole in the diaphram 40. The chamber 32 as well as the integral lid 36 can be made of any suitable material, including but not limited to tin, aluminum, copper, iron, magnesium, titanium, and various thermosetting and thermoplastic polymeric materials.

Figure 10:
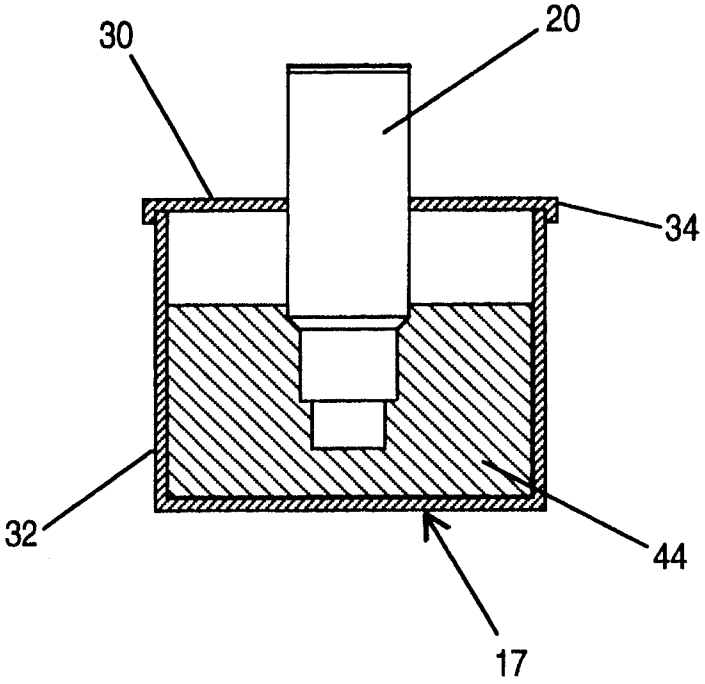
FIG. 10 (PRIOR ART)
FIG. 10 is a cross sectional view of another prior art device, including a container device and liquid sealant as the means for containing and applying sealant coating to ammunition.
Figure 9:
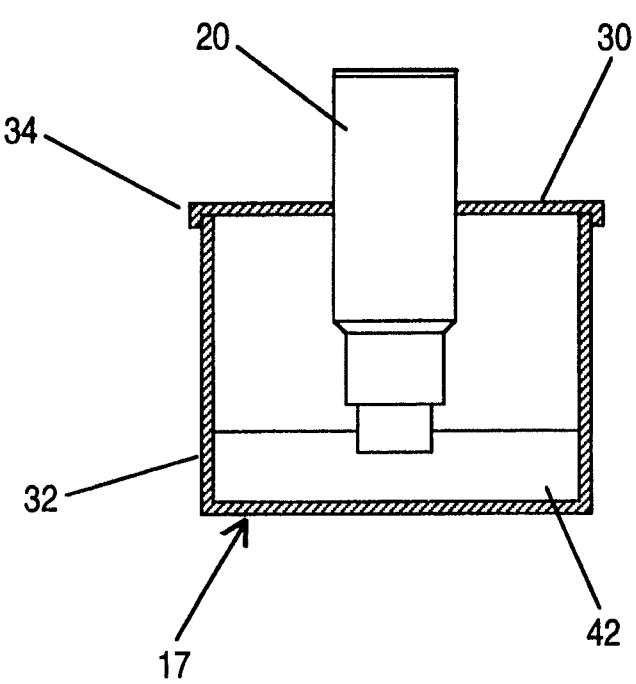
FIG. 9 (PRIOR ART)
FIG. 9 is a cross sectional view of a prior art coating device, including a container device and a saturated stamp pad as the means for containing and applying sealant coating to ammunition.
Figure 12:
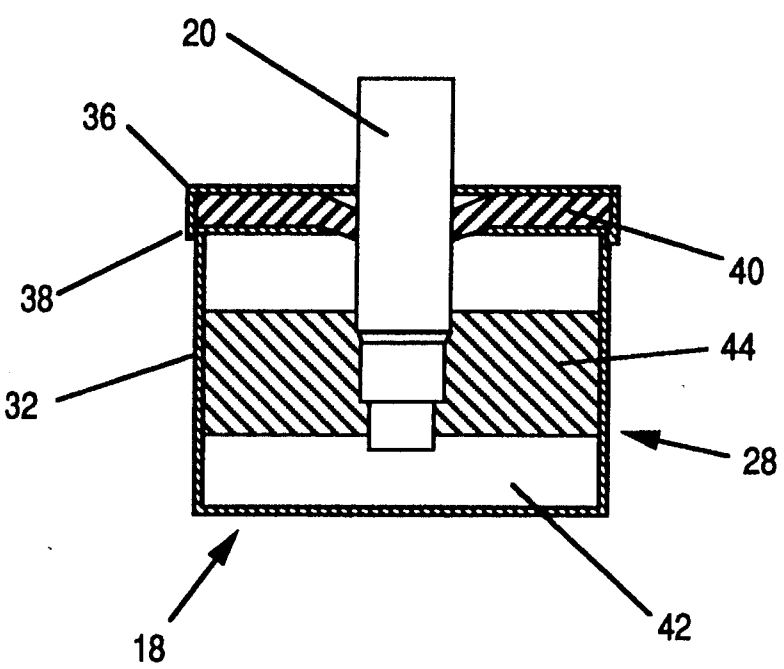
FIG. 12 is a cross sectional view of a coating device, including a container device, saturated stamp pad and liquid sealant, which is a preferred embodiment of the present invention for containing and applying sealant coatings to ammunition.

FIGS. 9 and 10 show generally prior art devices 17 incorporates a prior art container device 30 for application of sealant coatings to ammunition. In FIG. 9, the chamber 32 and lid 34 house a felt pad 42 which has been saturated with a sealant. The flechette cartridge 20 was lowered through the hole in the lid 34 and down through the saturated felt pad 42. The sealant, by the action of the felt pushing it against the flechette cartridge 20, coated the flechette cartridge 20, which was then removed from the prior art device 17. Although the sealant adhered to the flechette cartridge 20, it coated unevenly because there was no acceptable method of removing all of the excess sealant from the flechette cartridge 20.

As noted, in FIG. 10, the prior art device 17 exhibited the problem of inability to remove excess sealant. In FIG. 10, again, the flechette cartridge 20 was lowered into a sealant dip 44, and then removed, without removal of excess sealant. Unsatisfactory attempts at excess sealant removal included wiping the excess sealant from the flechette cartridge 20 when it was withdrawn from the dip 44.

Figure 11:
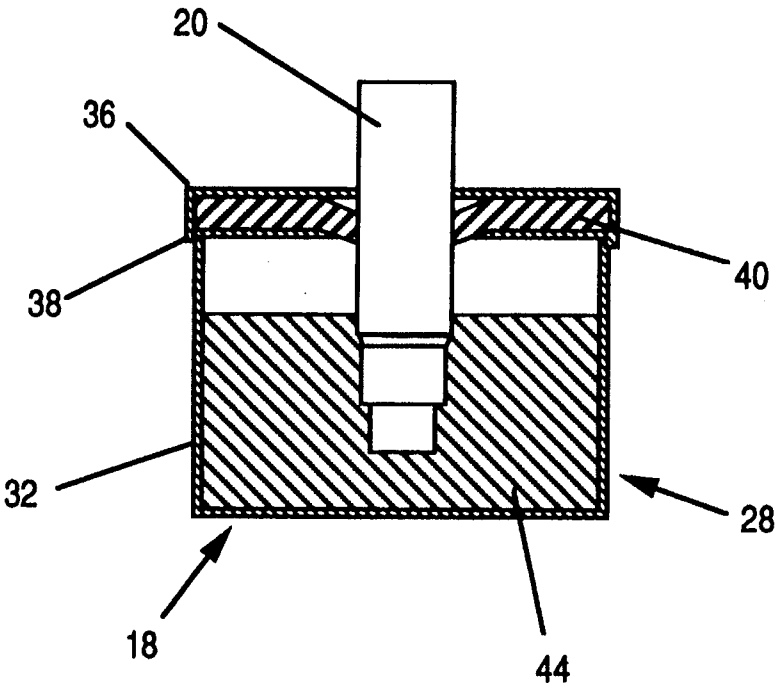
FIG. 11 is a cross sectional view of a coating device, including a container device and liquid sealant, which is a preferred embodiment of the present invention for containing and applying sealant coatings to ammunition.

Referring to FIGS. 11, 12, 13 and 14, there is shown different preferred embodiments using the coating device 18 of the present invention. In each, the container device 28 comprises the chamber 32, and the integral lid 36. Each integral lid 36 further consists of a diaphram 40 and the frame 38. Each coating device 18, shown in each different FIG. 11 through 14, shows a different sealing means inside the container device 28. Preferably, for the sealant, cellulose nitrate and asphalt sealants are used for coating a 5.56 mm flechette cartridge. FIG. 11 illustrates the application of the sealant dip 44 for coating the flechette cartridge 20. In operation, in FIG. 11, the flechette cartridge 20 is lowered through the integral lid 36 into the dip 44. The flechette cartridge 20 is then removed from the sealant dip 44 and back up through the integral lid 36. On its way back through the integral lid 36, the diaphram 40 acts as a squeegee and removes all of the excess sealant which may have collected on the flechette cartridge 20.

Figure 13:
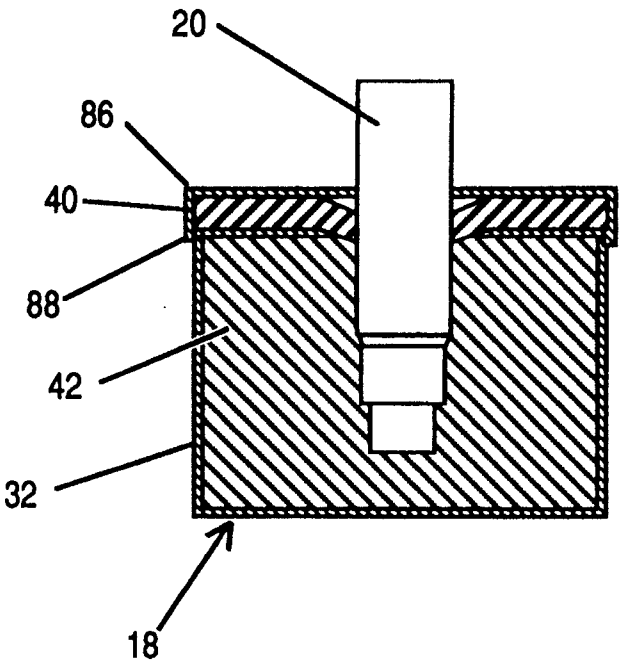
FIG. 13 is a cross sectional view of a coating device, including a container device and saturated stamp pad, which is a preferred embodiment of the present invention for containing and applying sealant coatings to ammunition.

In FIG. 13, showing another preferred embodiment, the flechette cartridge 20 is lowered through the hole in the integral lid 36 and down through the saturated felt pad 42. The sealant, by the action of the felt pushing it against the flechette cartridge 20, coats the flechette cartridge 20, the flechette cartridge 20 is then removed from the coating device 18. On its way back through the integral lid 36, the diaphram 40 acts as a squeegee and removes all of the excess sealant which may have collected on the flechette cartridge 20.

To avoid formation of air pockets at the tip of the sabot 26 when using the coating device 18 of the present invention as shown in FIG. 13, the felt pad 42 is positioned directly underneath the center of the integral lid 36. When the flechette cartridge 20 is inserted through the integral lid, hole it pushes the air bubbles out of the tip of the sabot 26. The sealant in the felt pad 42 then wets the tip of the sabot 26. Excess sealant may be removed from within the tip of the sabot by further blotting after removal of the flechette cartridge 20 from the coating device 18. Use of the preferred embodiment of FIG. 13 has given -the best results for application of sealant.

Figure 14:
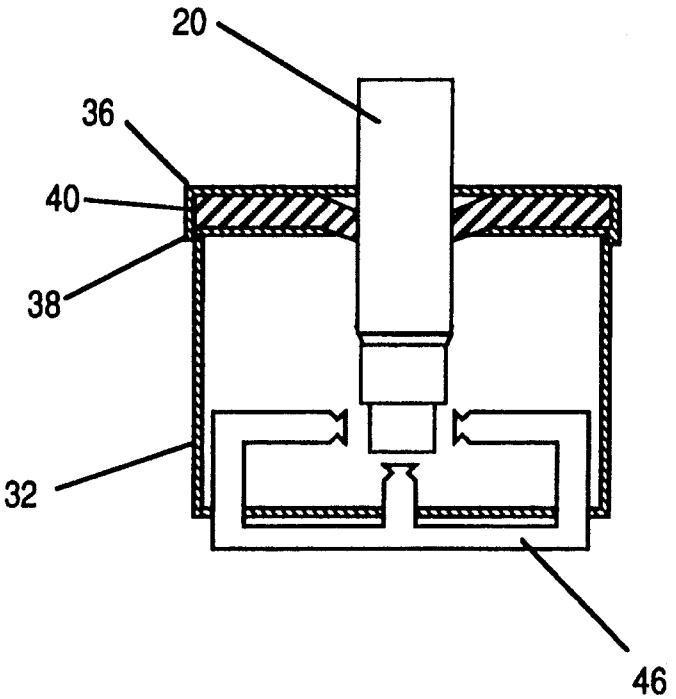
FIG. 14 is a cross sectional view of a device, including a container device and liquid sealant spray nozzles, which is a preferred embodiment of the present invention for containing and applying sealant coatings to ammunition.

Referring to FIG. 14, there is shown another preferred embodiment. Again, the flechette cartridge 20 is lowered through the hole in the integral lid 36 and down into the center of the chamber 32. Within the chamber is housed the spray system 46. The flechette cartridge 20 is then sprayed with sealant to apply the sealant. After sealant application, on its way back through the integral lid 36, the diaphram 40 acts as a squeegee and removes all of the excess sealant which may have collected on the flechette cartridge 20.

Figure 16:
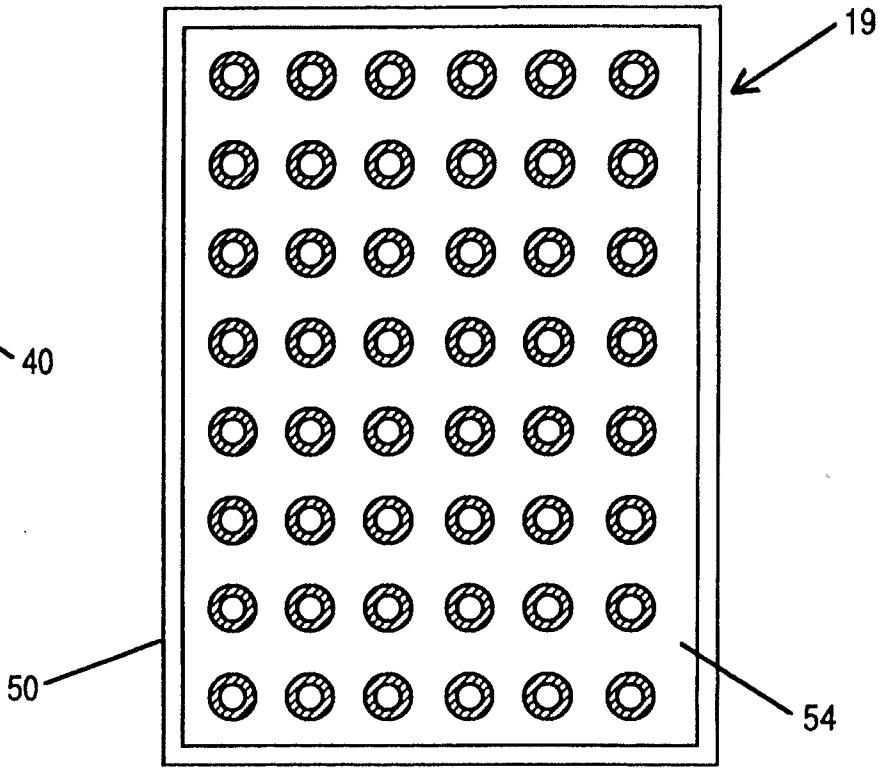
FIG. 16 is a top view of a multiple found coating device, including a container device, and showing typically housed therein a saturated stamp pad and liquid sealant, which is another preferred embodiment of the present invention for containing and applying sealant coatings to multiple rounds of ammunition at one time.
Figure 15:
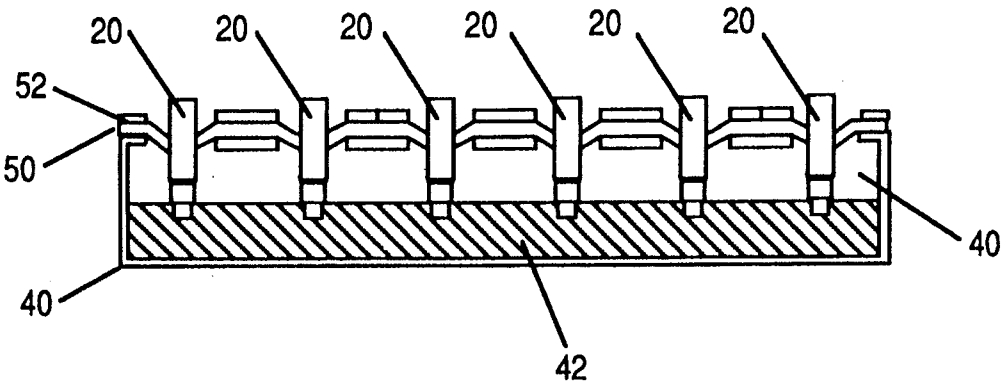
FIG. 15 is a cross sectional view of a multiple round coating device, including a container device, showing typically housed therein a saturated stamp pad and liquid sealant, which is another preferred embodiment of the present invention for containing and applying sealant coatings to multiple rounds of ammunition at one time.

In FIGS. 15 and 16 there is shown a coating device 19 of the present invention for sealant coating operations of more than one object at a time. The integral lid 50 can be modified to contain any number of holes, with either multiple diaphrams, or one integral diaphram 52 with multiple holes, such that each hoe in the integral diaphram 52 is surrounded by a frame hole of larger diameter of a multiple hole frame 54 for which the center points of the holes in the frame 54 and the integral diaphram 52 align. FIG. 16 is a top view of the integral lid 30. The integral chamber 48, also can be multiple chambers 32, and provides and contains the sealant and the means of applying the sealant.

Accordingly, modifications and variations to which the invention is susceptible may be practiced without departing from the scope and intent of the appended claims.

We claim:

1. A sealant applicator for holding and applying sealant to an ammunition, comprising:

a chamber containing sealant and a means for applying the sealant; and an integral lid on the chamber for penetrating the ammunition through into the chamber for sealant application inside the chamber, and removal after sealant application, during removal the integral lid intimately contacting the ammunition and wiping excess sealant from the ammunition.

2. The sealant applicator of claim 1, wherein the means for applying the sealant is a spray system.

3. The sealant applicator of claim 1, wherein the means for applying the sealant is a dip.

4. The sealant applicator of claim 1, wherein the means for applying the sealant is a stamp pad.

5. The sealant applicator of claim 1, wherein the means for applying the sealant is a dip and a stamp pad.

6. The sealant applicator of claim 1, wherein the integral lid is comprised of a frame and a diaphram.

7. The sealant applicator of claim 6, wherein the diaphragm is of hardness Durometer A40–45.

8. The sealant applicator of claim 6, wherein the diaphragm is a silicone rubber.

9. The sealant applicator of claim 6, wherein the diaphram is polysulfide.

10. A method of application of sealant to an ammunition comprising:

containing sealant and a means for applying sealant in a chamber;

penetrating the ammunition through the integral lid on the chamber into the chamber applying sealant to the ammunition inside the chamber removing the ammunition from the chamber after sealant application, during removal the integral lid intimately contacting the ammunition and wiping excess sealant from the ammunition.

11. A method for application of sealant to an ammunition as claimed in claim 10, wherein the sealant is applied with a spray system.

12. A method for application of sealant to an as claimed in claim 10, wherein the sealant is applied with a dip.

13. A method for application of sealant to an as claimed in claim 10, wherein sealant is applied with a stamp pad.

14. A method for application of sealant to an object as claimed in claim 10, wherein the sealant is applied with a dip and a stamp pad.

* * * * *